(12) United States Patent
Yuan

(10) Patent No.: US 12,402,770 B1
(45) Date of Patent: Sep. 2, 2025

(54) FLOOR CLEANING PAD

(71) Applicant: Dongguan Jiajieshi Technology Co., Ltd., Guangdong (CN)

(72) Inventor: Bifeng Yuan, Guangdong (CN)

(73) Assignee: Dongguan Jiajieshi Technology Co., Ltd., Dongguan (CN)

( * ) Notice: Subject to any disclaimer, the term of this patent is extended or adjusted under 35 U.S.C. 154(b) by 0 days.

(21) Appl. No.: 19/025,891

(22) Filed: Jan. 16, 2025

(30) Foreign Application Priority Data

Jul. 3, 2024 (CN) .......................... 202410886004.8

(51) Int. Cl.
| | |
|---|---|
| *A47L 13/16* | (2006.01) |
| *A47L 13/256* | (2006.01) |
| *B32B 3/06* | (2006.01) |
| *B32B 5/02* | (2006.01) |
| *B32B 5/26* | (2006.01) |
| *B32B 7/05* | (2019.01) |

(52) U.S. Cl.
CPC ............. *A47L 13/16* (2013.01); *A47L 13/256* (2013.01); *B32B 3/06* (2013.01); *B32B 5/02* (2013.01); *B32B 5/26* (2013.01); *B32B 7/05* (2019.01); *B32B 2250/20* (2013.01); *B32B 2250/44* (2013.01); *B32B 2262/0276* (2013.01); *B32B 2262/062* (2013.01); *B32B 2307/726* (2013.01); *B32B 2405/00* (2013.01); *B32B 2432/00* (2013.01)

(58) Field of Classification Search
CPC ........ A47L 13/16; A47L 13/38; A47L 13/252; A47L 13/255; A47L 13/20; B32B 2432/00; B32B 3/06; B32B 5/02; B32B 5/26; B32B 7/05
See application file for complete search history.

(56) References Cited

U.S. PATENT DOCUMENTS

| | | | |
|---|---|---|---|
| 5,855,204 A | * | 1/1999 | Gray ......................... A47L 1/15 15/228 |
| D846,213 S | * | 4/2019 | Keith ............................. D32/40 |
| 2008/0028560 A1 | * | 2/2008 | Policicchio ............. A47L 13/38 15/229.3 |
| 2018/0289234 A1 | * | 10/2018 | Policicchio ............. A47L 13/38 |

FOREIGN PATENT DOCUMENTS

DE 102009029049 A1 * 3/2011 ............. A47L 13/20

* cited by examiner

*Primary Examiner* — Laura C Guidotti
(74) *Attorney, Agent, or Firm* — Nitin Kaushik

(57) ABSTRACT

The present invention relates to the technical field of cleaning products, and especially relates to a floor cleaning pad. The floor cleaning pad includes a first sheet material, a second sheet material, and an absorption core, and further includes a function layer, the function layer includes at least three parts, and each part includes at least two layers; each layer includes a plurality of first strips extending towards two sides in a direction away from the center of the layer; and outer side ends of the first strips corresponding to the adjacent layers are not connected. The floor cleaning pad in the technical solution can not only effectively remove dirt such as debris on a floor, but also effectively clean out dirt such as debris, which is adsorbed into the floor cleaning pad, and expand a cleaning area.

8 Claims, 3 Drawing Sheets

FLOOR CLEANING PAD

TECHNICAL FIELD

The present invention relates to the technical field of cleaning products, and especially relates to a floor cleaning pad.

BACKGROUND

A floor, which refers to a surface layer of a ground or a floor of a house, is made of wood or other materials. With regard to special floors which are commonly used in homes or stages, etc., surfaces of these floors are usually provided with coatings, so that the floors are more wear-resistant and smoother, and therefore, these floors are also usually hydrophobic, and then are difficult to clean.

Especially if consumers do not use enough cleaning solution, the floors are especially difficult to clean. If the consumers use too much cleaning solution, not all of the cleaning solution can be absorbed by sheet materials of floor cleaning pads in a cleaning process. Insufficient cleaning for debris adhered to the floors may be caused due to too low friction coefficients between the cleaning pads and the floors. If the friction coefficients are too low, the cleaning pads may slip over the debris adhered to the floors. On the contrary, if the friction coefficients are too high, cleaning may be difficult to complete in a manual manner.

In this regard, the united states patent with a publication number US20240081603 A1 discloses a technical solution, the technical solution discloses a cleaning product, and the cleaning product is provided with a laminated structure, and includes a sheet-shaped object and a hydrophilic aggregation strip element, where the sheet-shaped object and the hydrophilic aggregation strip element are connected together in an adhesion manner. The aggregation strip element is provided with a plurality of layers which are mutually folded, a folding corner is formed between the layers, and strips extending outwards from an adhesion place are provided. Due to the plurality of layers which are mutually folded, the strips can effectively present a dynamically-changing area towards a target surface in a cleaning process and under normal use conditions. More liquids and related debris may be removed from the target surface through changing a surface area.

Although the technology has advanced, there is still a need for further improvement, for example, the debris cleaned by the cleaning product is prone to being hidden deep in the plurality of layers which are mutually folded, and the folding corners, and difficult to clean, so that the cleaning product quickly becomes dirty and cannot complete cleaning for large-area places, and a very limited service life is caused.

Therefore, the above technical problems need to be solved.

SUMMARY

In order to overcome the shortages of the prior art, the present invention discloses a floor cleaning pad, and aims to solve the technical problems that dirt and grime are prone to being hidden in a plurality of layers which are mutually folded, and folding corners of an existing floor cleaning product during cleaning, and difficult to clean, so that the floor cleaning product quickly becomes dirty and cannot complete cleaning for large-area places, and a very limited service life is caused.

In order to solve the above technical problems, a basic technical solution disclosed by the present invention is that:
a floor cleaning pad includes a first sheet material, a second sheet material, and an absorption core located between the first sheet material and the second sheet material, and further includes a function layer, where the function layer is connected to the second sheet material and arranged in a length direction of the second sheet material;
the function layer includes at least three parts, and each part includes at least two layers;
each layer comprises a plurality of first strips extending towards two sides in a direction away from the center of the layer; and
outer side ends of the first strips corresponding to the adjacent layers are not connected.

Further, the three parts include a first part, a second part, and a third part;
the first part is a cleaning area used for making contact with a floor;
the second part is a dust absorption area;
the third part is a water absorption area used for absorbing liquids; and
the dust absorption area is located between the cleaning area and the water absorption area.

Further, a length of the first strips on the second part is greater than that of the first strips on the first part and that of the first strips on the third part.

Further, outer side ends of the first strips of the different parts are arranged in a staggered manner.

Further, the second sheet material is provided with at least three layers;
each layer is provided with second strips extending from the center of the second sheet material to two sides in a width direction of the second sheet material; and
a length of the second strips is greater than that of the first strips, so as to realize coverage for the first strips.

Further, the second strip is located in a gap of the two adjacent first strips in the length direction, and used for shielding the gap.

Further, longitudinal sections of end parts of the second strips of the different layers in the second sheet material are arranged in an inverted-step shape.

Further, the first strips present a wavy curve from top to bottom in a longitudinal direction of the second sheet material; and
the second strips present a wavy curve from bottom to top in the longitudinal direction of the second sheet material.

Further, the first sheet material and the second sheet material enclose a hollow area; and
the hollow area is assembled with the absorption core.

Further, the first sheet material is further provided with an adhesion area which is used for being connected with an external device.

The beneficial effects of the present invention are that:
a floor cleaning pad in the technical solution of the present invention includes a first sheet material, a second sheet material, and an absorption core located between the first sheet material and the second sheet material, and further includes a function layer, where the function layer is connected to the second sheet material and arranged in a length direction of the second sheet material; the function layer includes at least three parts, and each part includes at least two layers; each layer includes a plurality of first strips extending towards two sides in a direction away from the center of the layer;

and outer side ends of the first strips corresponding to the adjacent layers are not connected. The floor cleaning pad in the technical solution can not only effectively remove dirt such as debris on a floor, but also effectively clean out dirt such as debris, which is adsorbed into the floor cleaning pad, and expand a cleaning area, so that a technical problem of a very limited service life of an existing floor cleaning product, is overcome.

Figure 1:
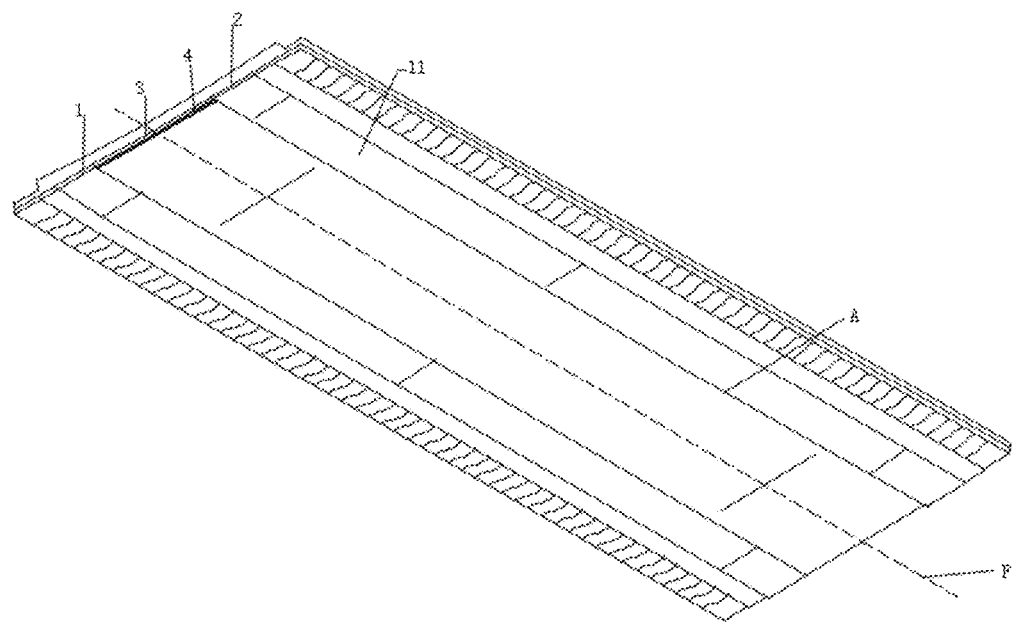
FIG. 1 is a schematic structure diagram of an upward surface of a floor cleaning pad in an example 1 of the present invention.

BRIEF DESCRIPTION OF MARKS OF THE DRAWINGS 1. first sheet material, 11. adhesion area, 2. second sheet material, 21. second strip, 211. end part, 3. hollow area, 4. absorption core, 5. function layer, 51. first part, 511. cleaning area, 52. second part, 521. dust absorption area, 53. third part, 531. water absorption area, 54. first strip, G. gap, and F. transversal center line.

DETAILED DESCRIPTION OF THE EMBODIMENTS

The technical solutions in the examples of the present invention will be clearly and completely described below in conjunction with FIG. 1 to FIG. 6, and apparently, the examples described are merely a part rather than all of the examples of the present invention. On the basis of the examples in the present invention, all other examples obtained by those of ordinary skill in the art without creative efforts shall fall within the protection scope of the present invention.

It needs to be noted that, if the directions involved in the examples of the present invention are based on those shown in the drawings, and if a certain specific posture is changed, the directional indications are also changed accordingly.

Floor cleaning pads are widely used in environments with floors for cleaning, however, dirt and grime are prone to being hidden in an existing floor cleaning pad, and difficult to clean, so that a limited area of a use area, and a very short service life of the floor cleaning pad are caused, and then quick replacement is required and resource waste is caused.

In this regard, the inventor provides a floor cleaning pad, and aims to solve the technical problem that dirt and grime are prone to being hidden in an existing floor cleaning pad, and difficult to clean.

Specifically, as shown in FIG. 1, a floor cleaning pad in the technical solution is of a multi-layer combined structure, and includes a first sheet material 1, a second sheet material 2 and an absorption 4, where the first sheet material 1, the second sheet material 2 and the absorption 4 are made of water-absorbing and dirt-resistant materials such as pure cotton and polyester fibers. An adhesion area 11 is formed in an outward surface of the first sheet material 1, located at two sides of a transversal center line F of the first sheet material 1, and used for being connected with an external device such as a mop in an assembly manner. The second sheet material 2 is connected to an inner side of the first sheet material 1, the first sheet material 1 and the second sheet material 2 are adhered together in a manner of hot-pressing, glue, or ultrasonic waves, after the first sheet material 1 and the second sheet material 2 are adhered, two adhesion traces A are formed on a surface of the outward surface of the first sheet material 1, and moreover, the two adhesion traces A are oppositely arranged relative to the transversal center line F. A hollow area 3 is enclosed at an adhesion place of the first sheet material 1 and the second sheet material 2, and assembled with the absorption core 4.

During use, a cleaning solution bottle may be carried on a mop rod which is connected with the first sheet material 1 in an assembly manner, and a cleaning solution in the cleaning solution bottle is communicated into the absorption core 4 through a guide pipe, so that the cleaning solution is injected into the absorption core 4, and when the cleaning floor pad makes contact with a floor, a user applies a pressure to the absorption core 4 through an assembly plate at the bottom of the mop rod, so that the cleaning solution in the absorption core 4 penetrates out and flows to the floor to be cleaned, and then dirt on the floor can be effectively further cleaned.

It needs to be noted that, in another use scene, the hollow area 3 can also be connected by an external clamping device in a clamping manner, and the external clamping device operates the floor cleaning pad to clean through clamping the hollow area 3.

Figure 2:
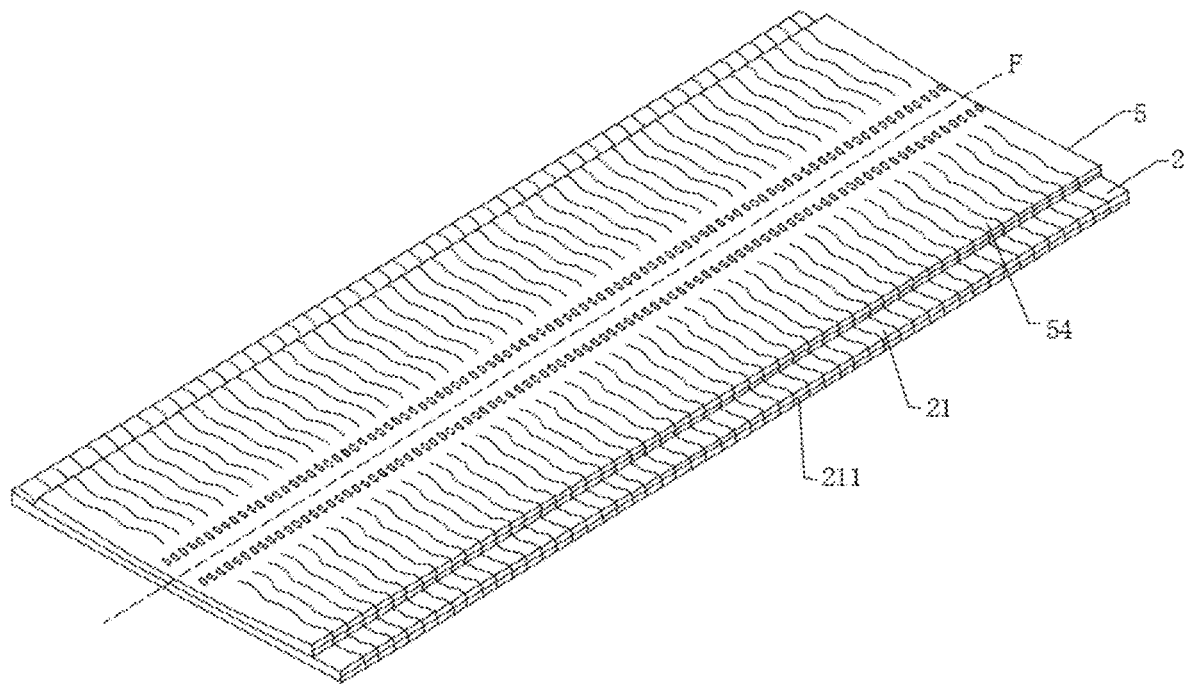
FIG. 2 is a schematic structure diagram of a surface where the floor cleaning pad in the example 1 of the present invention makes contact with a floor.
Figure 3:
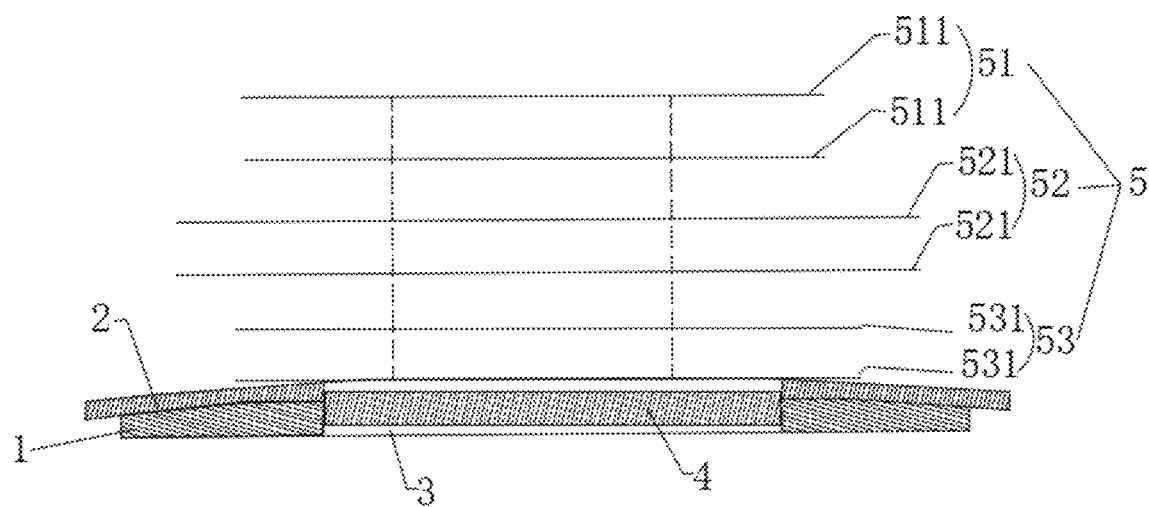
FIG. 3 is a schematic structure diagram of a function layer in the present invention.

Further, as shown in FIG. 2 and FIG. 3, the second sheet material 2 is provided with at least three layers; and each layer is provided with second strips 21 extending from the center of the second sheet material 2 to two sides in a width direction of the second sheet material 2.

Further, a function layer 5 is adhered to the other surface of the second sheet material 2, and connected to the second sheet material 2 and arranged in a length direction of the second sheet material 2; as shown in FIG. 3, the function layer 5 includes at least three parts, and each part includes at least two layers; each layer includes a plurality of first strips 54 extending in a direction away from the center of the layer, that is, towards two sides away from the transversal center line F; and outer side ends of the first strips 54 corresponding to the adjacent layers are not connected.

It should be understood that, the outer side ends of the first strips 54 corresponding to the adjacent layers are not connected, so that a crack between the first strips 54 corresponding to the adjacent layers can communicate with the outside. While being cleaned, the cleaning floor pad only needs to be placed under water flow to be flushed, so that the first strips 54 of the different layers are enabled to swing under the driving of the water flow to expose the cracks among the different layers, and then dirt, paper scraps, etc. which are hidden in the cracks are exposed, so that removal for the dirt, paper scraps, etc. from the cracks under the flushing of the water flow is facilitated.

Therefore, when the cleaning floor pad in the technical solution is used, even if dirt and grime are hidden among the layers, dirty particles can also flow out from the outer side ends of the first strips 54 through cleaning, so that the problem that dirt is hidden deep in the cleaning floor pad and cannot be cleaned, is effectively solved.

It further needs to be noted that, the outer side ends of the first strips 54 are free ends, the free ends may swing freely, an area where the first strips 54 make contact with the floor is an effective cleaning area, and along with a change of a contact position of the cleaning floor pad and the floor, the effective cleaning area of the first strips 54 dynamically moves along with the change of the contact position, so that debris can be better adsorbed into the first strips 54.

Detailedly, as shown in FIG. 3, the function layer 5 is provided with at least three parts, and the three parts include a first part 51, a second part 52, and a third part 53; and each part is preferably provided with at least two layers, so that better cleaning is facilitated. The first part 51 is a cleaning area 511 used for making contact with the floor;

The second part 52 is a dust absorption area 521; the third part 53 is a water absorption area 531 used for absorbing liquids; and the dust absorption area 521 is located between the cleaning area 511 and the water absorption area 531.

It needs to be noted that, the cleaning area 511 is made of a material with coarse patterns, the dust absorption area 521 is made of a material with fine patterns, and the water absorption area 531 is made of a material with high water absorption performance.

It should be understood that, due to the design, when the cleaning floor pad is used, the cleaning area 511 that makes contact with the floor can overcome a friction force between large-particle debris and the floor, so that a large amount of the particle debris are swept. However, there is always some fine dust on the floor, therefore, the dust absorption area 521 can make more sufficient contact with the fine dust on the floor through utilizing the own fine patterns, so that the dust is sufficiently adsorbed along with the change of the effective cleaning area of the first strips 54 in a cleaning process.

However, when there are water stains on the floor, the water absorption area 531 can quickly absorb the water stains, so as to keep the floor relatively dry and avoid slipping.

In a practical application, each part is preferably assembled with at least two layers, or three layers, or even more layers, and the number is specifically set according to actual needs.

Moreover, as shown in FIG. 3, a length of the first strips 54 on the second part 52 is greater than that of the first strips 54 on the first part 51 and that of the first strips 54 on the third part 53.

It should be understood that, due to a small volume of small particles such as the dust, the dust is difficult to sufficiently adsorb through using a regular cleaning floor pad. However, in the technical solution, the length of the first strips 54 on the second part 52 is greater than that of the first strips 54 on the first part 51 and that of the first strips 54 on the third part 53, so that a contact area of the second part 52 and the dust is increased, and it may be understood that, due to the design that the second part 52 is longer than the first part 51 and the third part 53, the contact area of the second part 52 and the dust on the floor is larger, so that in the cleaning process of the cleaning floor pad, the dust absorption area 521 of the second part 52 can make more sufficient contact with the dust on the floor, and then better absorption for the dust is facilitated.

In some practical application scenes, a plurality of the first parts 51, a plurality of the second part 52, and a plurality of the third part 53 may be arranged respectively according to actual needs, so that a user is facilitated to better use.

Figure 4:
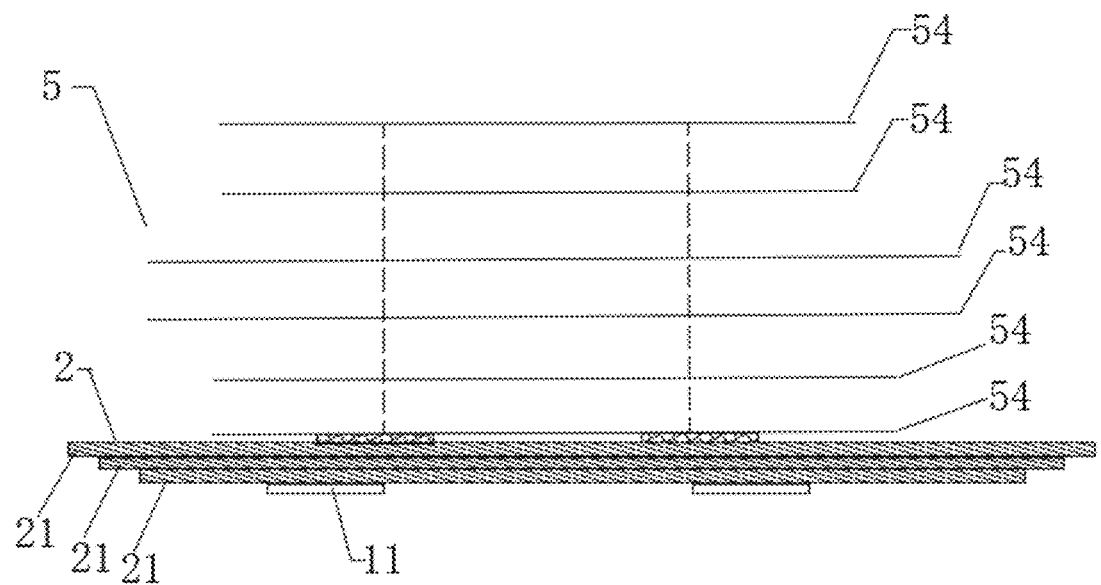
FIG. 4 is a schematic structure diagram of an assembly structure for first strips and second strips in the present invention.

Further, as shown in FIG. 4, outer side ends of the first strips 54 of the different parts are arranged in a staggered manner.

It should be understood that, due to the design, in the cleaning process of the cleaning floor pad, the first strips 54 of each of the adjacent layers swing along with position movement of the cleaning floor pad, so that the different parts can carry out respective duties, during cleaning, a cleaning area that each part makes contact with the floor is different, and particularly, the first strips 54 at the first part 51 are shorter than the first strips 54 at the second part 52, so that during working of the cleaning floor pad, dirt and debris which are not adsorbed by the first part 51 can be further adsorbed by the second part 52, and then more thorough cleaning is realized. Moreover, according to an actual cleaning situation, particles with large mass and volume are often gathered at the center in the cleaning process due to a large friction force between the particles and the cleaning floor pad, while particles with small volume and mass often scatter around the large-particle debris in the cleaning process due to a small friction force between the particles and the cleaning floor pad, therefore, the first strips 54 of the second part 52 are designed to be relatively long, so that increase for the contact area of contact with the floor can be better realized, an area of debris with small volume and mass can be covered, and then the effective cleaning area is expanded.

Further, in the example, the length of the second strips 21 is greater than that of the first strips 54, so that coverage for the first strips 54 is realized.

It should be understood that, in a use process of the cleaning floor pad, due to a light and thin material used for producing the cleaning floor pad, the outer side ends of the first strips 54 are prone to deviating from the floor and tilting outwards in the cleaning process, so that the case that the floor cannot be greatly cleaned occurs. In this regard, the inventor designs the length of the second strips 21 to be greater than that of the first strips 54, so as to realize coverage for the first strips 54, so that in the use process of the cleaning floor pad, the second strips 21 always cover above the first strips 54, and the problem that the outer side ends of the first strips 54 tilt outwards can be effectively prevented.

Figure 5:
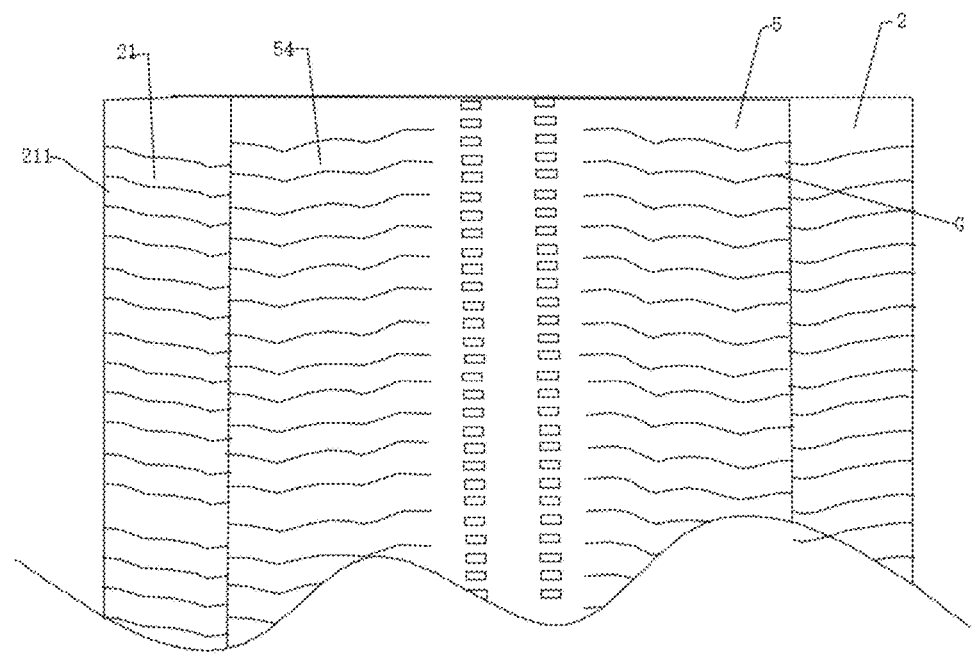
FIG. 5 is a schematic structure diagram of the assembly structure for the first strips and the second strips in the present invention from another perspective.

Further, as shown in FIG. 5, the second strip 21 is located in a gap G of the two adjacent first strips 54 in the length direction, and used for shielding the gap G.

It should be understood that, in the cleaning process of the cleaning floor pad, the free ends of the first strips 54 swing along with a change of a cleaning position, so that the gap G between the adjacent first strips 54 of the same layer or the different layers is increased, in order to prevent the floor corresponding to the gap G from being unable to be cleaned, the second strip 21 is arranged at a position covering the gap G, therefore, during the cleaning, the first strips 54 and the second strips 21 are arranged in a staggered manner in the cleaning area, that is, the second strip 21 is located at the gap G, and the first strip 54 is located at the gap between the adjacent second strips on the different layers of the same layer; and due to staggered arrangement, each place in the cleaning area corresponding to the cleaning floor pad can be covered by the cleaning floor pad, so that a situation that some places are not covered by the cleaning floor pad, and the cleaning purpose cannot be realized, is avoided. Therefore, the problem that the floor corresponding to the gap G cannot be cleaned, can be effectively solved in the manner.

In order to make the cleaning area of the cleaning floor pad more comprehensive, further, as shown in FIG. 5, the first strips 54 present a wavy curve from top to bottom in a longitudinal direction of the second sheet material 2; and the second strips 21 present a wavy curve from bottom to top in the longitudinal direction of the second sheet 2.

During use, along with the movement of the cleaning position of the cleaning floor pad, a swinging direction of the first strips 54 is opposite to that of the second strips 21. It may be understood that, during the cleaning, the swinging directions of the first strips 54 and the second strips 21 are opposite, so that the debris below the cleaning floor pad gradually approaches and gathers towards the center of the cleaning floor pad along with the swinging of the first strips 54 and the second strips 21 in the opposite directions, that is, concentrated storage for dirt located between the first strips 54 and the second strips 21 is contributed, and the dirt is further adsorbed onto the first strips 54 or the second strips 21.

Figure 6:
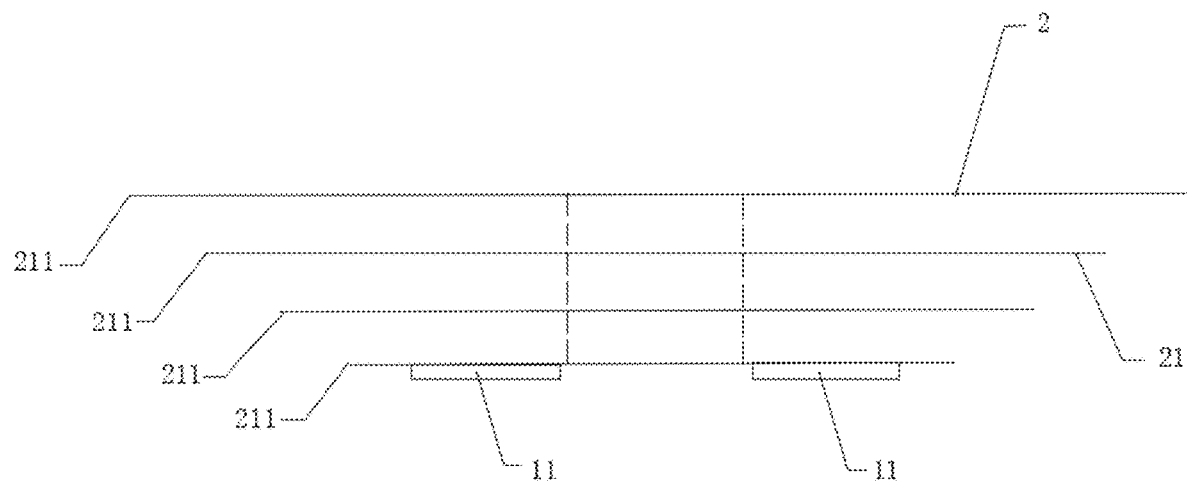
FIG. 6 is a schematic structure diagram of a second sheet material in the present invention.

Further, as shown in FIG. 6, longitudinal sections of end parts 211 of the second strips 21 of the different layers in the second sheet material 2 are arranged in an inverted-step shape.

It should be understood that, due to the design, the different layers on the second sheet material 2 are tightly pressed onto the function layer 5 in a stacked manner, and due to a certain mass of the second sheet material 2, the second sheet material 2 covers above the function layer 5, so that a contact friction force between the function layer 5 and the floor can be indirectly increased, the function layer 5 is more closely attached to the floor, and the debris can be more effectively adsorbed. In addition, the outer side ends of the first strips 54 on the function layer 5 can further be effectively prevented from tilting to assist the function layer 5 to clean, so that an area of an effective cleaning area of the function layer 5 and the floor is increased.

It further needs to be noted that, the end parts 211 of the second strips 21 of the adjacent layers on the second sheet material 2 are also in an unconnected state, and the principle is the same as that of the first strips 54, and is also to avoid the problem that dirt and grime are hidden among the different layers, and difficult to handle, so that during the cleaning of the cleaning floor pad, the debris in interlayers can flow out from unconnected places along with a water flow, and the problem that the debris is difficult to clean due to deep hiding is avoided.

In summary, the floor cleaning pad in the technical solution is provided with a plurality of layered structures, and an outer side end of each layer is in a separated state, so that in the cleaning process of the cleaning floor pad, the problem that the dirt is adsorbed into the interlayers of the different layers and different to clean is effectively solved, the dirt hidden deep in the interlayers is enabled to flow out from isolated places through flushing the interlayers, and then cleaning is achieved.

According to the disclosure and teachings of the above specification, those skilled in the art to which the present invention belongs may also make changes and modifications to the above implementation manners. Therefore, the present invention is not limited to the specific implementation manners disclosed and described above, and some modifications and changes to the present invention should also fall within the protection scope of the claims of the present invention. In addition, although some specific terms are used in the specification, these terms are merely for the convenience of description, and do not constitute any limitation on the present invention.

What is claimed is:

1. A floor cleaning pad, comprising a first sheet material, a second sheet material, and an absorption core located between the first sheet material and the second sheet material, and
further comprising a function layer, wherein the function layer is connected to the second sheet material and arranged in a length direction of the second sheet material;
the function layer comprises at least three parts, and each part comprises at least two layers;
each layer of the at least two layers of the each part comprises a plurality of first strips extending towards two sides in a direction away from the center of the layer of the at least two layers of the each part; and
outer side ends of the first strips corresponding to the adjacent layers are not connected;
wherein
the three parts comprise a first part, a second part, and a third part;
the first part is a cleaning area used for making contact with a floor;
the second part is a dust absorption area;
the third part is a water absorption area used for absorbing liquids; and
the dust absorption area is located between the cleaning area and the water absorption area;
wherein
a length of the first strips on the second part is greater than that of the first strips on the first part and that of the first strips on the third part.

2. The floor cleaning pad according to claim 1, wherein outer side ends of the first strips of the different parts are arranged in a staggered manner.

3. The floor cleaning pad according to claim 1, wherein the second sheet material is provided with at least three layers;
each layer of the at least three layers of the second sheet material is provided with second strips extending from the center of the second sheet material to two sides in a width direction of the second sheet material; and
a length of the second strips is greater than that of the first strips, so as to realize coverage for the first strips.

4. The floor cleaning pad according to claim 3, wherein the second strip is located in a gap of the two adjacent first strips in the length direction, and used for shielding the gap.

5. The floor cleaning pad according to claim 3, wherein longitudinal sections of end parts of the second strips of the different layers of the at least three layers in the second sheet material are arranged in an inverted-step shape.

6. The floor cleaning pad according to claim 3, wherein the first strips present a wavy curve from top to bottom in a longitudinal direction of the second sheet material; and
the second strips present a wavy curve from bottom to top in the longitudinal direction of the second sheet material.

7. The floor cleaning pad according to claim 1, wherein the first sheet material and the second sheet material enclose a hollow area; and
the hollow area is assembled with the absorption core.

8. The floor cleaning pad according to claim 1, wherein the first sheet material is further provided with an adhesion area which is used for being connected with an external device.

* * * * *